United States Patent
Iwamoto et al.

(10) Patent No.: US 6,641,006 B2
(45) Date of Patent: Nov. 4, 2003

(54) CONTAINER STOPPER

(75) Inventors: Yoshihiro Iwamoto, Osaka (JP); Futoshi Yabuuchi, Osaka (JP)

(73) Assignee: Allgo Co., Ltd., Osaka (JP)

( * ) Notice: Subject to any disclaimer, the term of this patent is extended or adjusted under 35 U.S.C. 154(b) by 114 days.

(21) Appl. No.: 10/007,013

(22) Filed: Nov. 5, 2001

(65) Prior Publication Data
US 2002/0053578 A1 May 9, 2002

(30) Foreign Application Priority Data
Nov. 8, 2000 (JP) ........................................ 2000-340032

(51) Int. Cl.[7] .................................................. B67D 3/00
(52) U.S. Cl. ........................ 222/482; 222/518; 141/247
(58) Field of Search ................................. 222/482, 509, 222/518; 141/347

(56) References Cited

U.S. PATENT DOCUMENTS

| | | | | |
|---|---|---|---|---|
| 535,252 A | * | 3/1895 | Leggett | 220/86.1 |
| 595,454 A | * | 12/1897 | Foreman | 220/86.1 |
| 756,373 A | * | 4/1904 | Joyce | 222/518 |
| 5,497,917 A | * | 3/1996 | Krimmel et al. | 222/482 |
| 5,699,719 A | * | 12/1997 | Lucas et al. | 215/13.1 |
| 5,911,345 A | * | 6/1999 | Castleberry | 222/482 |
| 6,269,984 B1 | * | 8/2001 | Murakami | 222/518 |

* cited by examiner

Primary Examiner—Kenneth Bomberg

(57) ABSTRACT

The present invention provides a container stopper in which a structure is simplified to reduce a cost, a troublesome operation is unnecessary, and liquid can be poured in and out by an easy operation which does not require time and effort.

The present invention is a container stopper comprises a pour-out passage through which liquid in a container is poured outside in a stopper main body, an operating valve for opening and closing the pour-out passage, a stopper cover with which an upper portion of the stopper main body is covered, and a valve body operating portion for sliding the operating valve up and down as a lever outside the stopper cover is operated, wherein a pour-in passage through which the liquid is poured into the container from outside and which does not cross the pour-out passage is provided in the stopper main body and a pour-in valve for normally closing the pour-in passage and for opening the pour-in passage only in pouring-in of the liquid is provided.

13 Claims, 2 Drawing Sheets

CONTAINER STOPPER

BACKGROUND OF THE INVENTION

1. Field of the Invention

The present invention relates to a container stopper through which liquid can be poured into and out from a container while the stopper is screwed into a mouth of the container.

2. Description of the Prior Art

Conventionally, in a container stopper, a thread is formed on an outer periphery of a stopper main body, a pour-out passage through which liquid in the container is poured outside is provided in the stopper main body, an operating valve for opening and closing the pour-out passage is provided, a stopper cover with which an upper portion of the stopper main body is covered is provided, and a valve body operating portion for sliding the operating valve up and down as a lever outside the stopper cover is operated is provided. After the thread of the stopper main body is screwed into the mouth of the container, the container is tilted, the lever is moved down to connect an inside of the container and the pour-out passage, and the liquid in the container is poured outside.

However, in order to pour liquid into the container, it is necessary to detach the stopper screwed into the mouth of the container from the mouth of the container and then to pour the liquid from the mouth of the container.

Therefore, it is necessary to frequently attach and detach the stopper, which results in extremely troublesome operation.

A stopper of a container used for a drink extractor or the like for extracting coffee, tea, and the like is provided inside with a pour-in passage. In a state in which the stopper is attached to the container, extract extracted by the drink extractor is directly stored in the container through the pour-in passage of the stopper and the container is warmed by a warmer or the like of the drink extractor.

In order to pour out extract in the container, the stopper is detached from the mouth of the container and then, the container is tilted to pour the extract into a cup and the like. After pouring out, the stopper is mounted to the container again and the container is maintained at a warmed state by the warmer or the like.

However, because the pour-in passage in the stopper of the container of the drink extractor is constantly open, a large capacity of a heater for keeping warmth and a long time for which the heater for keeping warmth is turned on are necessary so as to keep a predetermined high temperature of the liquid in the container and a cost rises.

Furthermore, in order to pour the liquid into the cup and the like, it is necessary to detach the stopper from the container and then to attach the stopper. Therefore, the stopper is frequently attached and detached, which results in operation which requires time and effort.

Therefore, it is an object of the present invention to provide a container stopper in which the above problems in prior-art container stoppers are solved, a structure is simplified to reduce a cost, a troublesome operation is unnecessary, and liquid can be poured in and out by an easy operation which does not require time and effort.

SUMMARY OF THE INVENTION

To achieve the above object, a container stopper of the present invention comprises a pour-out passage through which liquid in a container is poured outside in a stopper main body, an operating valve for opening and closing the pour-out passage, a stopper cover with which an upper portion of the stopper main body is covered, and a valve body operating portion for sliding the operating valve up and down as a lever outside the stopper cover is operated, wherein a pour-in passage through which the liquid is poured into the container from outside and which does not cross the pour-out passage is provided in the stopper main body and a pour-in valve for normally closing the pour-in passage and for opening the pour-in passage only in pouring-in of the liquid is provided.

DETAILED DESCRIPTION OF THE PREFERRED EMBODIMENT

An embodiment of the present invention will be described below based on the drawings.

Figure 1:
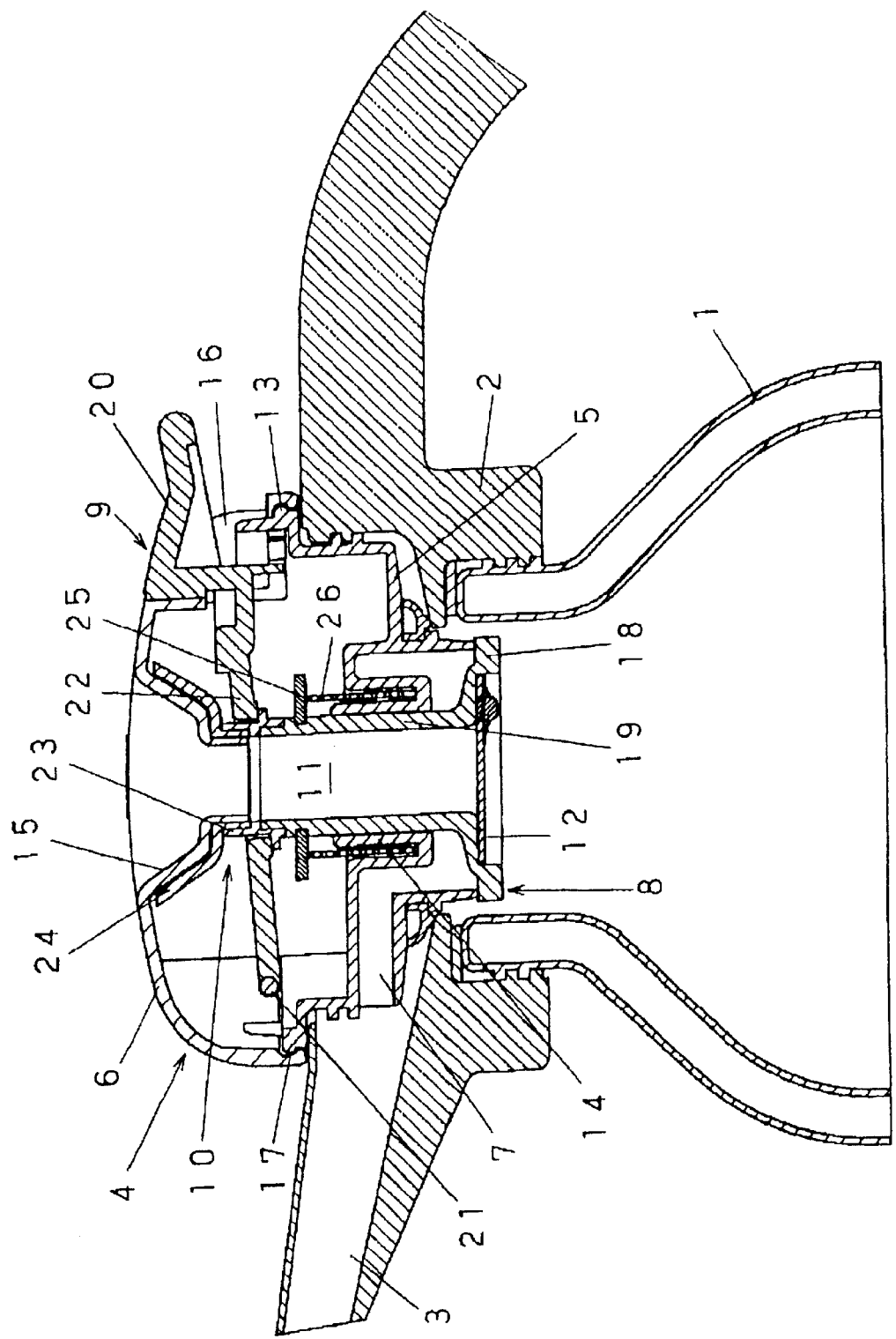
FIG. 1 is a vertical sectional view of an embodiment of the present invention.
Figure 2:
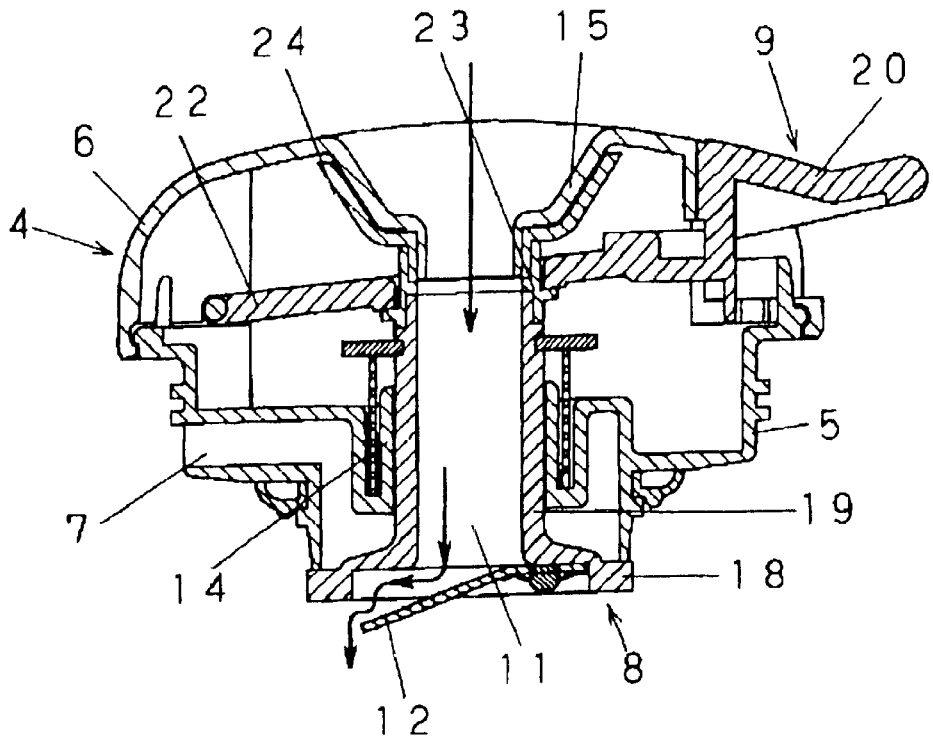
FIG. 2 is a drawing of operation showing pouring-in in the embodiment of the invention.
Figure 3:
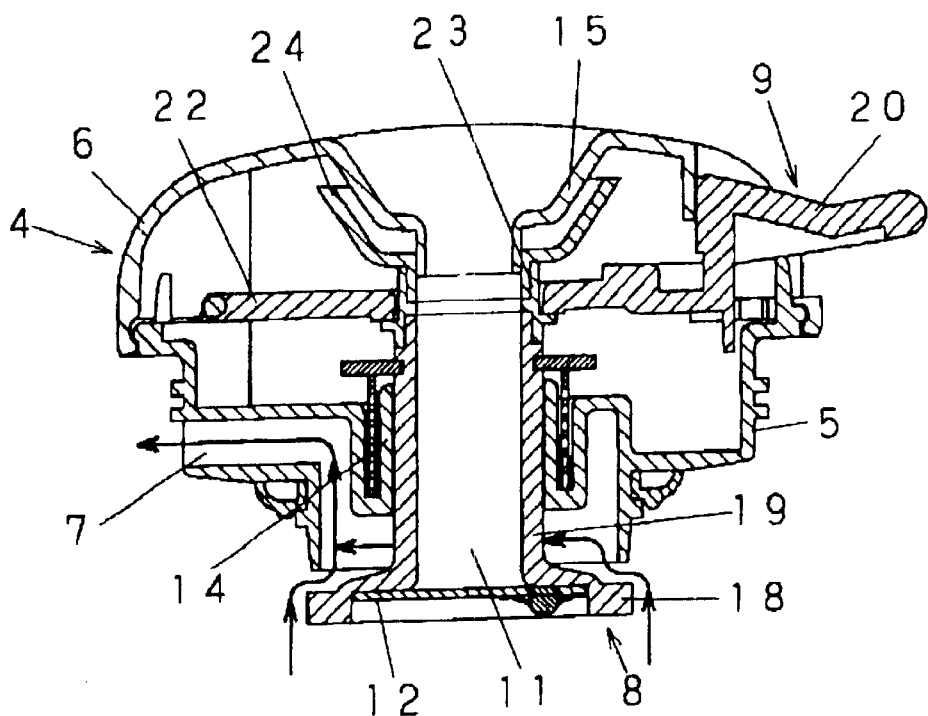
FIG. 3 is a drawing of operation showing pouring-out in the embodiment of the invention.

In the drawings, FIG. 1 is a vertical sectional view of the embodiment of the invention, FIG. 2 is a drawing of operation showing pouring-in in the embodiment of the invention, and FIG. 3 is a drawing of operation showing a pouring-out in the embodiment of the invention.

A shoulder member 2 is connected to an upper end of a container 1 and the container 1 is a bottle made of a single-layer or vacuum double-layer metal or glass.

The single-layer glass bottle is especially effective when it is used in a drink extractor. A spout portion 3 through which liquid in the container 1 passes is provided to a front portion of the shoulder member 2, a central opening communicating with a mouth of the container 1 is formed at a center of the shoulder member 2, and an internal thread is formed on an inner peripheral wall forming this central opening. This spout portion 3 communicates with a lower portion of the central opening.

A stopper 4 is formed of a stopper main body 5 on which outer peripheral wall an external thread to be screwed into the internal thread of the shoulder member 2 of the container 1 is formed, a stopper cover 6 with which an upper end of the stopper main body 5 is covered, an operating valve 8 for opening and closing a pour-out passage 7 in the stopper main body 5, a lever 9 projecting rearward from the stopper cover 6 to slide up and down, a valve body operating portion 10 for sliding the operating valve 8 up and down as the lever 9 is operated, and a pour-in valve 12 for opening and closing a pour-in passage 11 vertically passing through the stopper 4.

An opening communicating with a mouth of the container 1 is provided to a lower end portion of the stopper main body 5, the pour-out passage 7 communicating with the opening is provided to an upper portion of the opening, and a pour-out opening at a front portion of the pour-out passage 7 communicates with the spout 3 of the shoulder member 2. The stopper main body 5 is formed on the outer peripheral wall thereof with the external thread to be screwed into the internal thread of the shoulder member 2 and the stopper main body 5 is screwed into the central opening of the shoulder member 2. Fitting projections 13 to be fitted into fitting recessed portions 17 of the stopper cover 6 which will be described later are provided at predetermined intervals on an outer peripheral wall of an upper end of the stopper main body 5.

A guide tube portion 14 into which a tube portion 19 of the operating valve 8 which will be described later can be inserted is provided to a central portion of the stopper main body 5. This guide tube portion 14 has such a diameter that the tube portion 19 of the operating valve 8 which will be described later can smoothly move up and down.

A funnel portion 15 in a funnel shape having a hollow central portion is provided to the stopper cover 6 with which the upper end of the stopper main body 5 is covered, a notch portion 16 for allowing the lever 9 to slide up and down is provided to a rear end of the stopper cover 6, and the fitting recessed portions 17 to be fitted with the fitting projections 13 of the stopper main body 5 are provided at predetermined intervals on an inner peripheral wall of a lower end of the stopper cover 6.

The operating valve 8 for opening and closing the pour-out passage 7 in the stopper main body 5 is integrally formed with a valve body portion 18 for opening and closing an inlet of the pour-out passage 7 and the tube portion 19 for sliding up and down in the guide tube portion 14 of the stopper main body 5 at an upper portion of the valve body portion 18. Central portions of the valve body portion 18 and the tube portion 19 are hollow bodies forming a lower portion of the pour-in passage 11. The pour-in passage 11 does not communicate with the pour-out passage 7. A reference numeral 25 designates a push plate fixed to an outer peripheral wall of an upper portion of the tube portion 19 and a reference numeral 26 designates a spring for constantly pushing up the operating valve 8.

The lever 9 which can slide up and down is integrally formed with a push body portion 20 projecting rearward from the stopper cover 6 and a support portion 22 pivoted on a support shaft 21 at a front portion of an upper portion of the stopper main body 5.

The support portion 22 of the lever 9 is provided at a central portion thereof with a through hole through which a joint tube body 23 of the valve body operating portion 10 which will be described later can smoothly move up and down.

The valve body operating portion 10 is formed of the hollow joint tube body 23 connected to an upper end of the tube portion 19 of the operating valve 8 and a covering tube portion 24 in a funnel shape connected to an upper end of the joint tube body 23.

The joint tube body 23, the covering tube portion 24, and the funnel portion 15 of the stopper cover 6 form a hollow body forming an upper portion of the pour-in passage 11.

The joint tube body 23 is provided with a flange portion mounted to the upper end of the tube portion 19 of the operating valve 8 and constantly in contact with a lower end of a peripheral wall forming the through hole of the support portion 22 of the lever 9. The joint tube body 23 on the flange portion passes through the through hole of the support portion 22 of the lever 9 and projects upward.

The covering tube portion 24 of the valve body operating portion 10 is formed into the funnel shape. A lower portion of the covering tube portion 24 is mounted to an inner peripheral wall of an upper portion of the joint tube body 23. With an upper portion of the covering tube portion 24, a lower wall of the funnel portion 15 of the stopper cover 6 is covered.

The joint tube body 23 of the valve body operating portion 10 and the covering tube portion 24 move down as the operating valve 8 moves down. A lower end of the funnel portion 15 of the stopper cover 6 and an upper end of the covering tube portion 24 constantly communicate with each other when the joint tube body 23 and the covering tube portion 24 have moved to the lowest positions such that poured-in liquid from the funnel portion 15 does not flow into between the stopper cover 6 and the stopper main body 5.

The pour-in valve 12 for opening and closing the pour-in passage 11 is formed into a flat shape by using elastic material such as rubber and is mounted to a lower portion of the valve body portion 18 of the operating valve 8 to constantly close a pouring outlet at a lower portion of the pour-in passage 11. The pour-in valve 12 moves down due to a weight of liquid when the liquid passes through the pour-in passage 11 and forms a gap between the pour-in valve 12 and the pour-in passage 11. When the liquid stops passing through the pour-in passage 11, the pour-in valve 12 returns due to its elastic force to close the pour-in passage 11.

The pour-in valve 12 only has to constantly close the pour-in passage 11 and to open the pour-in passage 11 when liquid is poured into the pour-in passage 11 and it is possible to dispose a spring or the like at a position where the pour-in valve 12 is mounted to the valve body portion 18 such that moving up and down of the pour-in valve 12 can be freely adjusted. It is also possible to mount the pour-in valve 12 to the valve body operating portion 10 forming the pour-in passage 11 or the funnel portion 15 of the stopper cover 6.

Next, operation will be described. A state in which the stopper 4 is screwed into the central opening of the shoulder member 2 at the upper portion of the container 1 is maintained. In order to pour liquid into the container 1, liquid is poured toward the funnel portion 15 of the stopper cover 6. The poured liquid passes through the pour-in passage 11 and passes through the gap between a lower end opening of the pour-in passage 11 and the pour-in valve 12 to be stored in the container 1 while pushing the pour-in valve 12 down with the weight of the liquid (see arrows in FIG. 2).

When pouring of the liquid is stopped, the pour-in valve 12 returns to close the pour-in passage 11. By closing of the pour-in valve 12 of the pour-in passage 11, the liquid in the container 1 can be maintained in a heat-insulated state.

Next, in order to pour the liquid in the container 1 out into an outside cup or the like, the push body portion 20 of the lever 9 is pushed down. Because the flange portion of the joint tube body 23 of the valve operating portion 10 is constantly in contact with the lower face of the peripheral wall forming the through hole of the support portion 22 of the lever 9, the valve body operating portion 10 and the operating valve 8 move down against elastic force of the spring 26 to create a gap between a pouring inlet of the pour-out passage 7 and the valve body portion 18 of the operating valve 8 (see arrows in FIG. 3).

If the container 1 is tilted in this pushed-down state of the lever 9, the liquid in the container 1 passes through the pour-out passage 7 in the stopper 4 and is discharged from the spout portion 3 of the shoulder member 2. Then, if the lever 9 is released, the operating valve 8, the valve body operating portion 10, and the lever 9 return by repulsing force of the spring 26 and the closed state of the pour-out passage 7 is maintained by the operating valve 8.

Therefore, because the pour-out passage 7 and the pour-in passage 11 are constantly closed when the stopper 4 is mounted to the container 1, it is possible to constantly maintain the heat-insulated state of the liquid in the container 1 for a long time.

Although what is considered to be a representative example of the invention has been described above, the invention is not necessarily limited to the structure of the embodiment only. It is also possible to carry out the invention by properly modifying the invention as long as the modification has the above constituent features of the invention, achieves the object of the invention, and has the following effects by eliminating the shoulder member, forming a thread at a mouth of the container, and directly mounting the stopper to the mouth, for example.

From the above description of this invention, the following reference is already cleared. The container stopper of the present invention comprises a pour-out passage through which liquid in a container is poured outside in a stopper main body, an operating valve for opening and closing the pour-out passage, a stopper cover with which an upper portion of the stopper main body is covered, and a valve body operating portion for sliding the operating valve up and down as a lever outside the stopper cover is operated, wherein a pour-in passage through which the liquid is poured into the container from outside and which does not cross the pour-out passage is provided in the stopper main body and a pour-in valve for normally closing the pour-in passage and for opening the pour-in passage only in pouring-in of the liquid is provided. Then this invention provides a container stopper in which the above problems in prior-art container stoppers are solved, a structure is simplified to reduce a cost, a troublesome operation is unnecessary, and liquid can be poured in and out by an easy operation which does not require time and effort.

What is claimed is:

1. A dispenser unit for storing and dispensing liquid, comprising:
    a container, having an aperture, for storing the liquid;
    a stopper member mounted on the container to control the container aperture and having a first passageway with a first movable valve unit for controlling access to the container for dispensing the liquid through the front passageway and a second passageway with a second movable valve unit for controlling access to the container for introducing liquid into the container through the second passageway, wherein the second passageway includes a tube with a funnel opening in a central portion of the stopper member and a second movable valve member is positioned at the bottom of the stopper member, the tube has a lower flange that forms a valve member of the first movable valve unit, an annular spring extends around the tube and an actuator lever operatively connected to the tube, and biased away from the container by the annular spring, the actuator lever permits the user to move the tube to open the first movable valve unit when the actuator lever is depressed to force the tube downward towards the container.

2. The dispenser unit of claim 1 wherein the second movable valve unit is positioned in the center of the stopper member.

3. The dispenser unit of claim 1 wherein the second movable valve unit is a check valve for permitting liquid to pass in one direction into the container.

4. The dispenser unit of claim 1 wherein the second movable valve unit is a flapper valve member with an elastic material that moves due to the weight of the liquid in one direction to permit the introduction of the liquid into the container.

5. The dispenser unit of claim 1 wherein the first passageway includes an annular conduit that extends around the second passageway.

6. The dispenser unit of claim 1 wherein the second movable valve unit includes an elastic valve member biased against the end of the tube to provide a one way entrance of liquid into the container.

7. The dispenser unit of claim 6 wherein the stopper member has a recessed central opening approximately the size of the aperture and co-axially with the funnel opening of the tube.

8. A dispenser unit for storing and dispensing liquid, comprising:
    a container, having an aperture, for storing the liquid;
    a stopper member mounted on the container to control the container aperture and having a first passageway with a first movable valve unit for controlling access to the container for dispensing the liquid through the first passageway and a second passageway with a second movable valve unit for controlling access to the container for introducing liquid into the container through the second passageway, wherein the second passageway forms an aperture component of the first movable valve unit; and
    an actuator lever operatively connected to the second passageway to permit the user to move the second passageway to open the first movable valve unit wherein the second passageway has a lower flange that forms a valve member of the first movable valve unit and an annular spring extends around the second passageway and biases the actuator lever away from the container.

9. The dispenser unit of claim 8 wherein the second movable valve unit is a check valve for permitting liquid to pass in one direction into the container.

10. The dispenser unit of claim 8 wherein the second movable valve unit is a flapper valve member with an elastic material that moves due to the weight of the liquid in one direction to permit the introduction of the liquid into the container.

11. The dispenser unit of claim 8 wherein the first passageway includes an annular conduit that extends around the second passageway.

12. The dispenser unit of claim 8 wherein the second passageway includes a tube with a funnel opening in a central portion of the stopper member and a second movable valve member is positioned at the bottom of the stopper member.

13. The dispenser unit of claim 12 wherein the second movable valve unit includes an elastic valve member biased against the end of the tube to provide a one way entrance of liquid into the container.

* * * * *